(No Model.) 3 Sheets—Sheet 1.
L. THOMAS.
MACHINE FOR THE MANUFACTURE OF COMPRESSED TABLETS.
No. 528,572. Patented Nov. 6, 1894.
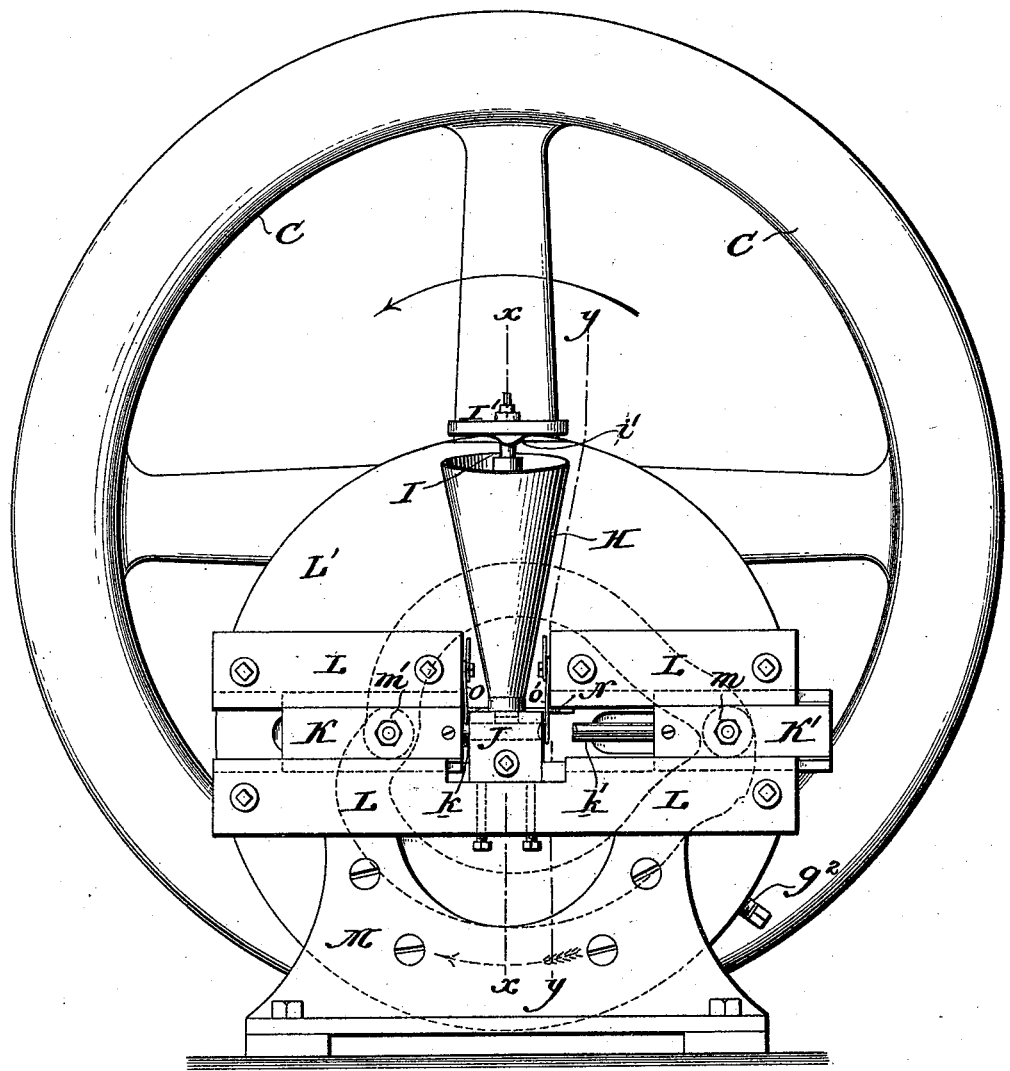

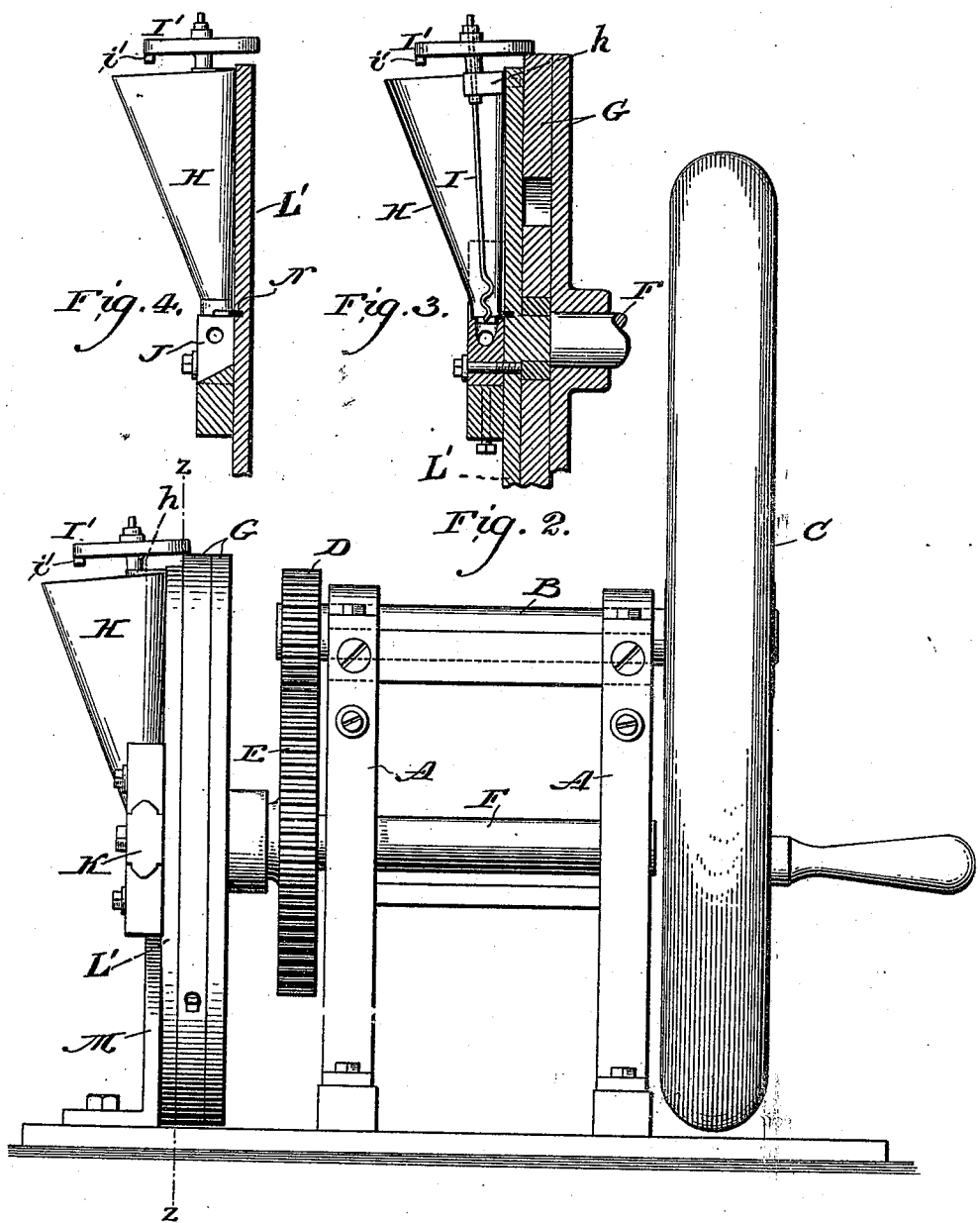

(No Model.) 3 Sheets—Sheet 3.
L. THOMAS.
MACHINE FOR THE MANUFACTURE OF COMPRESSED TABLETS.
No. 528,572. Patented Nov. 6, 1894.
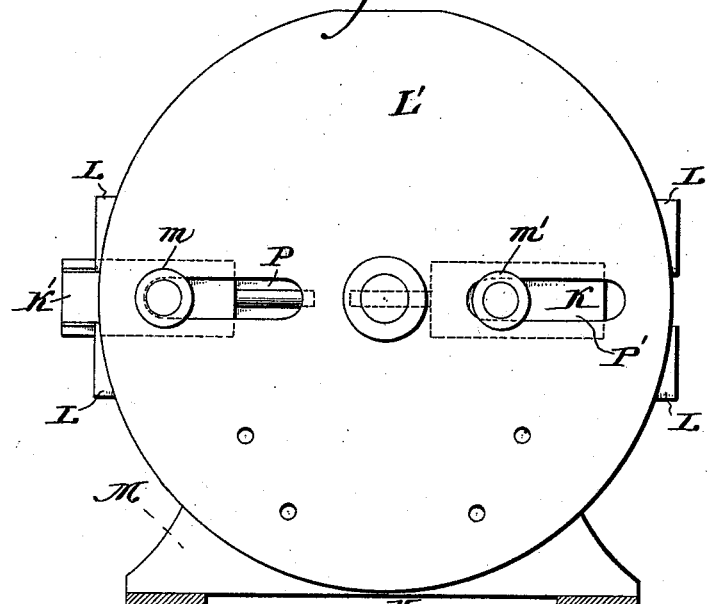
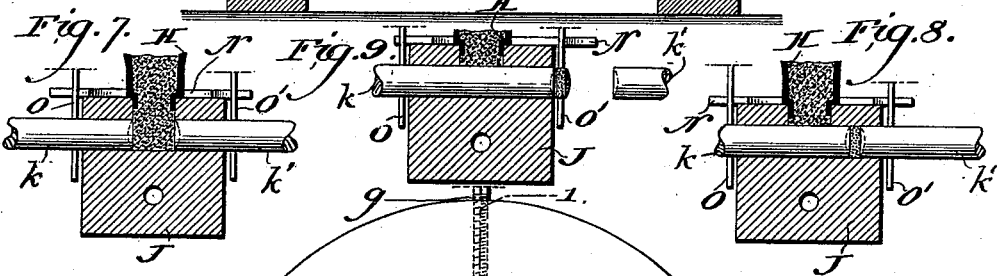
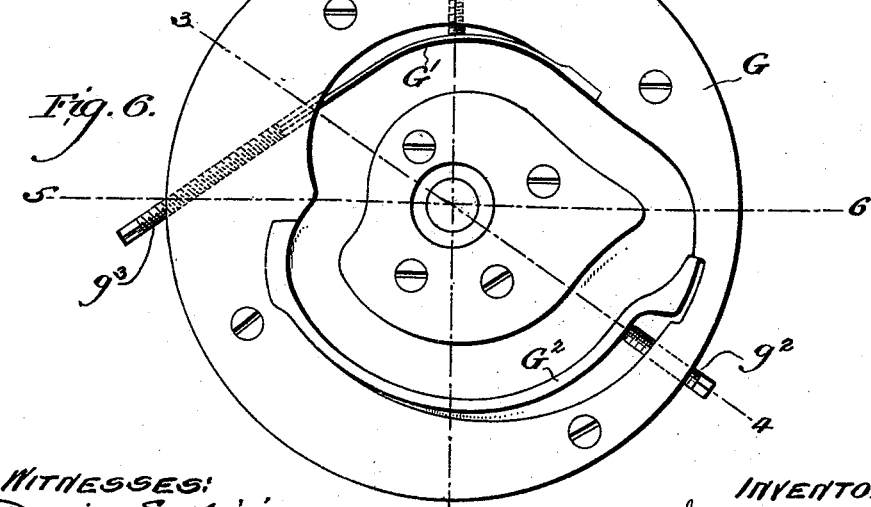
WITNESSES:
David S. Williams
Chas. C. Collier
INVENTOR:
Lancaster Thomas,
By Chas. B. Collier,
Atty.
THE NORRIS PETERS CO., PHOTO-LITHO., WASHINGTON, D.C.

UNITED STATES PATENT OFFICE.

LANCASTER THOMAS, OF PHILADELPHIA, PENNSYLVANIA.

MACHINE FOR THE MANUFACTURE OF COMPRESSED TABLETS.

SPECIFICATION forming part of Letters Patent No. 528,572, dated November 6, 1894.

Application filed January 26, 1894. Serial No. 498,085. (No model.)

*To all whom it may concern:*

Be it known that I, LANCASTER THOMAS, a citizen of the United States, residing in the city and county of Philadelphia, State of Pennsylvania, have invented certain new and useful Improvements in Machines for the Manufacture of Compressed Tablets, of which the following is a specification.

My invention relates to that class of machines designed for the manufacture of compressed tablets; and its object is so to simplify the construction and operation of such machines, intended for the manufacture of medicinal and other tablets, as to increase the efficiency thereof and the quality of its product.

The prominent feature which distinguishes my invention from all others, for similar purposes, consists in the fact that in all other such machines one of the dies reciprocates forward and backward in the mold without at any time, during the operation of the machine, being entirely withdrawn from the mold, while in my machine both dies are alternately withdrawn entirely from the mold, thus preventing clogging of the mold and dies by the powdered material employed, and making the cleaning of the dies comparatively easy, whereas in other machines this is difficult.

The first novel characteristic of my machine is that of a mold which has an orifice extending from side to side and into which the material to be compressed is fed, and which is adapted to receive, at its opposite ends, two tablet compressing and forming dies, which alternately leave the mold entirely.

The second novel characteristic of my machine is that of a revolving cam-way combined with dies operating rollers, working therein, and also in slots, in a supporting frame, the dies and rollers being restrained from any but a horizontal movement by said slots and by guides in which the dies slide.

The third novel characteristic of my machine consists in the relative movements of the dies, which, instead of being caused to alternately approach toward and recede from each other, are caused by the revolving cam, hereinbefore referred to, to first move in the same direction at different speeds, but relatively toward each other, until compression is accomplished, then to continue in the same direction but relatively away from each other, one die acting as a carrier and ejector of the tablet by moving to the end of the die-orifice opposite to that which it enters.

The fourth novel characteristic of my machine is that of a reciprocating bar operated directly by the die-carrier which bar, in turn, operates a spring so that it will strike and detach the tablet at the moment the ejecting die reaches its limit of movement. I thus provide for the possibility of a tablet otherwise so adhering to the die that it will not drop from it.

The fifth novel feature of my invention is that of a feed-adjusting-spring, which is preferably attached to the revolving cam and which, by means of a screw, may be adjusted so as to vary the extent of horizontal movement of the rollers, and through them vary the distance between the dies when the same are in a position to allow the material to be fed into the mold.

The sixth novel feature of my invention is that of a compressing spring, which is preferably attached to the revolving cam, and which, by means of a screw, may be adjusted so as to vary the extent of horizontal movement of the rollers, and through them vary the distance between the dies when the same are in the position they assume at the moment of compression. I carry out my invention by means of the combination of mechanism hereinafter particularly described, but which may be varied in many respects without departing from my invention.

Referring to the drawings:—Figure 1, is a front elevation; Fig. 2, a side elevation; Fig. 3, a section on line x—x, of Fig. 1; Fig. 4, a section on line y—y, of Fig. 1. Fig. 5, is a section on line z—z, of Fig. 2. Fig. 6, is a face view of cam G, and Figs. 7, 8, and 9 are sectional diagrams illustrating the operation of the mold and dies. Fig. 10 represents the device for removing the compressed tablets from the ends of the dies.

A, is the main frame; B, the driving shaft; C, the fly-wheel, which may be operated by hand or by power; D, a pinion mounted on the end of the driving shaft and which meshes with the gear-wheel E on the cam-shaft F.

G, is a face-cam on the cam shaft, F.

G' is a feed-adjusting-spring, and $g$, a screw for adjusting the same.

G$^2$, is a compressing spring, and $g^2$ is a screw for adjusting the same. The function of these springs will be hereinafter described.

H, is a hopper secured to a bracket $h$, on the supporting plate L', and I, is a feeder also supported by the bracket, $h$, which is rotated by friction disk, I', which in turn, is rotated by the face of cam G, by frictional contact therewith.

$i'$ is a lug placed at or near the edge of the lower face of disk I', thereby imparting a vertical motion to the feed device as it comes in contact with the periphery of cam G.

J is a mold bolted on to the face of the plate L', into which mold the material from the hopper is fed.

K and K' are die carriers working in the guides L, and $k$ and $k'$ the dies having concave recesses at their inner ends of the reverse contour of the sides of the tablets.

L, are guides resting on the supporting frame, M, and suitably secured to plate L'.

$m$ and $m'$ are cam-rollers rotating on journals passing through the horizontal slots, P and P', respectively, of the plate L'. These cam-rollers, $m$ and $m'$ are secured to the die carriers K and K', respectively.

The revolution of the face-cam, G, imparts horizontal movement to the rollers, $m$ and $m'$, which, in turn, impart a corresponding movement to the dies $k'$ and $k$.

N, is a reciprocating bar (see Fig. 10) which I place loosely in a groove in the plate L'. It is withheld from falling therefrom by the springs, $o$ and $o'$, and projects slightly from the face of the plate so as to permit one of the die-carriers to strike it and give it a lateral movement along its groove.

Having now already indicated the construction of the machine, I will proceed to describe its operation.

Assume that the dies are in the position indicated in Fig. 7. Material from the hopper, H, has been fed into the mold J, and the face-cam, G, is at that point in its revolution which will bring the cam-rollers opposite to each other in the cam-way on the line 1—2 of Fig. 6. Through the connections before described between the wheel, C, and the face-cam G, the latter is revolved, and imparts to the rollers a horizontal movement in the slots, P and P' which causes the die carriers K and K' to travel along the guides, L. The contour of the cam-way is such that both dies travel in the same direction, but one of the dies (say die $k'$) travels at a somewhat slower rate than the other, thus eventually bringing them into relative positions indicated in Fig. 8. The material has in the meantime been gradually compressed, and at this point the compression is greatest. The cam-rollers now occupy opposite positions in the cam-way on the line 3—4 Fig. 6. The face-cam G, continuing to revolve continues to impart a horizontal movement to the dies, the contour being such that the dies continue to travel in the same direction as during the compressing process, the die $k$, however, traveling somewhat more slowly than the die $k'$ which eventually brings them into the relative positions indicated in Fig. 9. The tablet is now by the action of the displacing spring, free to fall from the end of the die $k$, into a suitable receiving vessel. The cam-rollers now occupy opposite positions in the cam-way on the line 5—6 Fig. 6. Further revolution of the face-cam G causes the dies $k$ and $k'$, to travel back to their original positions, when the material is free to again feed into the die. The face-cam has now accomplished half a revolution, and the cam rollers once more occupy opposite positions in the cam-way on the line 1—2 Fig. 6.

It will be observed from an inspection of Fig. 6 that the cam-way near the screw $g$, is widened out to a greater width than the diameter of the rollers $m$ $m'$. While that portion of the cam-way is traveling toward the roller, the rollers are moving toward the center of the plate L' or toward the position that they assume in Fig. 7. Hence the tendency of the rollers is to roll along the outer wall of the cam. By adjusting the spring G' by means of the screws $g$ or $g^3$ the roller may be caused to roll a greater or less distance toward the inner wall of the cam, which, in turn, causes its corresponding die to move a greater or less distance toward the center of the mold. Hence by adjustment of the spring the feed of material into the mold may be accurately regulated, and this spring I therefore denominate a feed-adjusting spring. In like manner, when the rollers occupy opposite positions in the cam-way on the line 3—4, at which time the final compression of the tablet takes place, the roller adjacent to the screw $g^2$, may be caused to travel a greater or less distance toward the center of the frame by adjusting the spring G$^2$ whereby the corresponding die will be forced a greater or less distance toward the other die, thus determining the extent of compression of the tablet. This spring I therefore denominate as the compressing-spring. When the dies are in the position indicated in Fig. 9 the tablet as before described, is free to fall. It may, however, in some instances, tend to adhere to the end of the die $k$, and to obviate this I provide the sliding-bar N, (see Fig. 10) which immediately before the die $k$ reaches the position described, is struck by the die carrier and is pushed along by it. The spring $o'$ which is directly opposite the tablet when the latter is being ejected, rides over the projecting portion of the bar N, and strikes said tablet, detaching it from the die $k$.

In like manner the spring $o$ detaches the tablet when the dies are in the same relative position at the opposite end of the mold. These springs I therefore denominate tablet-displacing springs.

It is not necessary to the proper carrying out of my invention, that the dies should have the relative movements described. These movements may be varied as described by varying the contour of the face-cam G.

In all tablet-compressing machines, of the type to which my invention belongs, of which I have any knowledge, in which the compression of the tablet is effected by laterally moving dies, there is a pressure space only in one side of the mold and the compression of the tablet is, consequently, effected only upon one side of the feed aperture. Again, in all such machines the compressed tablet is ejected only from one side of the mold, and by one of the dies, only, and only one tablet is produced by each entire reciprocation of the die, the compression, also, being effected while one of the dies is at rest. Machines of such type are illustrated in the patents of Witzel, No. 470,028, dated March 1, 1892, and Sears, No. 473,432, dated April 19. 1892. In contradistinction of such machines the mold, according to my invention, has a pressure space on each side of the feed aperture and the tablets are, alternately, compressed on each side of such feed aperture while the dies are performing useful work during their entire movements, respectively, whether advancing or retracting, while within the mold, and the compressed tablets are ejected, alternately, from opposite sides of the mold by each die in its order, and for each entire reciprocation of the dies two tablets are produced. My mold is, in fact, a double mold and the capacity of a machine constructed according to my invention is more than double the capacity of any machine for similar purposes heretofore constructed, while at the same time, it is much more simple than machines heretofore constructed and is comparatively inexpensive to build.

Having now described my invention, what I claim as new, and desire to secure by Letters Patent, is—

1. In a machine for manufacturing compressed tablets, pills, &c., the combination of a mold having a central vertical feed and a pressure space on each side of said feed aperture, with reciprocating dies, or plungers, each of which, alternately, acts to convey the material to the right or left of the vertical feed into a pressure space, and to compress the same in such space against the opposite resisting die, and each of which, alternately, acts to eject the compressed pill from that side of the mold opposite to that where it entered the mold, substantially as described.

2. In a machine for manufacturing compressed tablets, pills, &c., the combination of a feeding device I with disk I' and face-cam G, for effecting the rotation thereof, and provided with lug $i'$, for effecting a vertical movement of said feeding device at each revolution thereof, substantially as described.

3. In a machine for manufacturing compressed tablets, pills, &c., reciprocating dies $k\ k'$, bar N provided with wedge-shaped projections at or near its opposite ends, and means for reciprocating said bar alternately in opposite directions, in combination with springs adapted to ride over said projections, respectively, so as to engage with and displace the compressed tablets from the ends of the dies, substantially as described.

4. In a machine for manufacturing compressed tablets, pills, &c., the cam G in combination with feed adjusting spring G', screws $g$ and $g^3$, compressing spring $G^2$, and screw $g^2$, whereby the face of said cam is varied so as to effect a variable feed of material and the compression thereof, as desired, substantially as described.

5. In a machine for manufacturing compressed tablets, pills, &c., the combination of a mold J, die carriers K K', dies $k\ k'$, rollers $m\ m'$ supported on journals passing through the die carriers K K' said journals reciprocating in slots P P', feed adjusting spring G' located within the channel of rollers $m\ m'$ and adjusting screw $g$, substantially as described.

6. In a machine for manufacturing compressed tablets, pills, &c., the combination of mold J, dies $k\ k'$ cam G, for reciprocating said dies, carriers K K' and rollers $m\ m'$ for connecting the dies to the cam, compressing spring $G^2$ and adjusting screw $g^2$ for effecting a variable pressure of the tablet, substantially as described.

In witness whereof I have hereunto set my signature in the presence of two subscribing witnesses.

LANCASTER THOMAS.

Witnesses:
GEO. W. REED,
CHAS. C. COLLIER.